(No Model.) 2 Sheets—Sheet 1.

G. H. REYNOLDS.
MECHANICAL MOVEMENT.

No. 479,526. Patented July 26, 1892.

(No Model.) 2 Sheets—Sheet 2.

G. H. REYNOLDS.
MECHANICAL MOVEMENT.

No. 479,526. Patented July 26, 1892.

Witnesses
Jno. G. Hinkel
Alle N. Dobson

Inventor
George H. Reynolds
By Foster Freeman
Attorneys

UNITED STATES PATENT OFFICE.

GEORGE H. REYNOLDS, OF NEW YORK, N. Y., ASSIGNOR, BY MESNE ASSIGNMENTS, TO THE NATIONAL COMPANY, OF CHICAGO, ILLINOIS.

MECHANICAL MOVEMENT.

SPECIFICATION forming part of Letters Patent No. 479,526, dated July 26, 1892.

Application filed March 4, 1892. Serial No. 423,781. (No model.)

*To all whom it may concern:*

Be it known that I, GEORGE H. REYNOLDS, a citizen of the United States, residing in the city, county, and State of New York, have invented certain new and useful Improvements in Mechanical Movements, of which the following is a specification.

In operating the parts of different apparatus—as, for instance, the stop-valve of lifting apparatus, or the actuating-valves of said apparatus and shifting-gear of various kinds—it is frequently necessary to move the part to be shifted by a movement of the hand or of some other operating part that is uniform in speed, while the valve or other part to be moved should be started at a slow speed and moved with a constantly-accelerated motion or started rapidly and then moved with a constantly-decreasing rate of motion, as in the case of stop-valves.

My invention is a mechanical device whereby the movement of the operating part at a uniform speed is positively imparted to the part to be actuated at a constantly increasing or decreasing speed.

Figure 1:
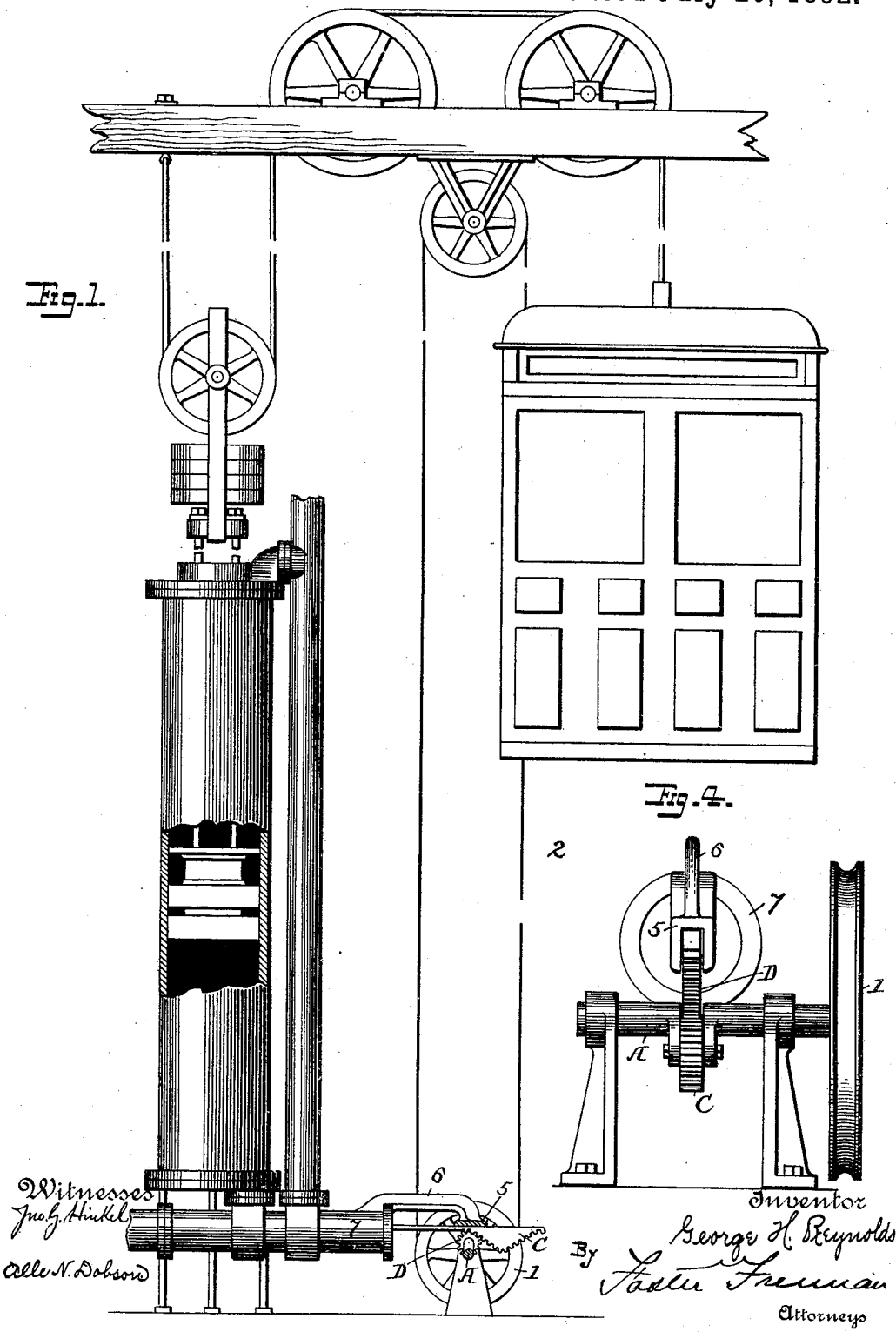
Figure 2:
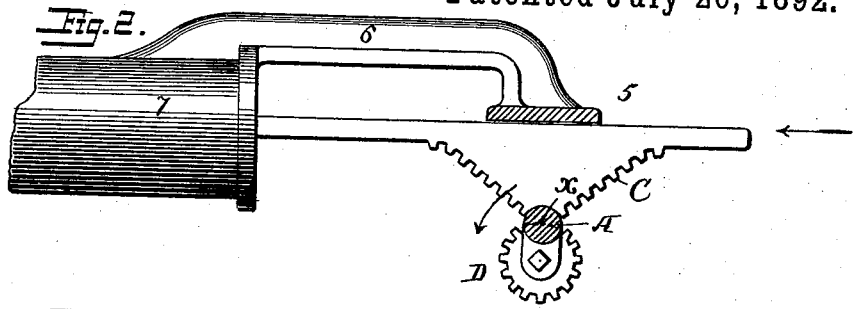
Figure 3:
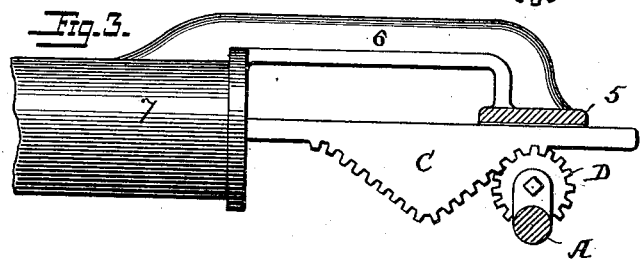
Figure 5:
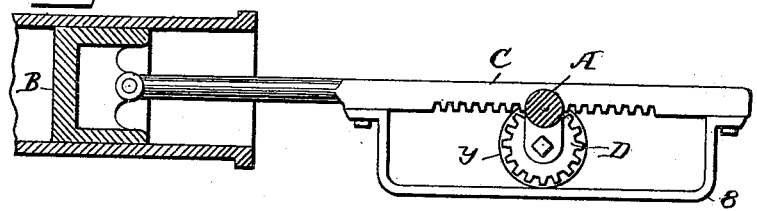
Figure 6:
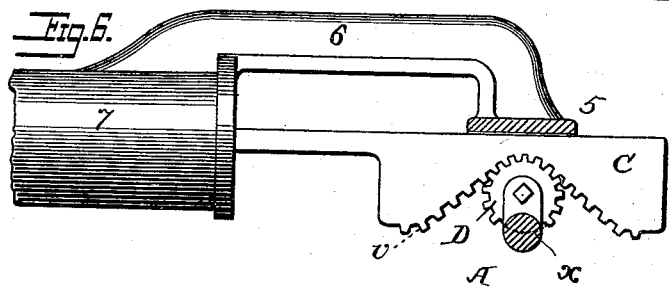
Figure 7:
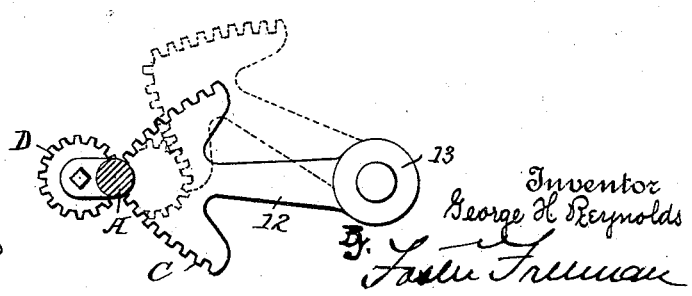

In the accompanying drawings, Figure 1 is an elevation of an elevating apparatus, showing my improved mechanical movement in connection with the valve of said apparatus. Fig. 2 is an enlarged view of part of a valve device and valve-actuating parts; Fig. 3, a view of the parts shown in Fig. 2 in a different position; Fig. 4, an end view, looking in the direction of the arrow, Fig. 2; Fig. 5, a view showing another means of embodying my improved movement; Fig. 6, a view illustrating the construction when the speed of the parts is to decrease after starting. Fig. 7 is another form in which the parts may be made.

A represents a shaft, to which movement is imparted at a practically uniform speed—as, for instance, the shaft to which the pulley 1 is connected for receiving the hand-rope 2 of an elevating apparatus.

B is the part to which a gradually increasing or decreasing movement is to be imparted from the uniform rotation of the shaft A. As in the drawings, said part is the valve of the valve device of a hydraulic elevator.

Between the part B and the shaft A are interposed the parts which constitute my improved mechanical movement, the said parts consisting of a rack C and a pinion D. The pinion D, instead of being placed concentrically with the shaft A, is so placed that the pitch-line $x$ of its gears will intersect the axis of said shaft, as shown in the drawings, and where it is desired to move the rack C in a straight line the said rack, instead of having its teeth upon a continuously-straight edge, has them arranged upon two inclined lines, which either meet at the lowest point of the rack, as in Fig. 2, or at the highest point of the rack, as in Fig. 6, and the pinion D is so adjusted that when the rack is in its central position either the portion of the pinion intersecting the axis of the shaft A or the opposite will be at the central point of the rack, as shown in Figs. 2 and 6. The difference between the highest and lowest portions of the rack is equal to the diameter of the pinion D. Assuming the parts to be in the position shown in Fig. 2 and that the shaft A is revolved in the direction of its arrow, it will be seen that the initial movement upon the pitch-line of the pinion D is simply a movement of rotation around the axis of the shaft A with little tendency to move the rack; but that as this movement continues the rack is fed toward the left at a very low rate of speed, which, however, gradually increases as the movement continues, and that there is a constant increase in the distance between the axis of the shaft A and the point where the pitch-line of the pinion engages the teeth of the rack, so that by the time the rack has reached the limit of its movement toward the left, as shown in Fig. 3, the distance between the axis of the shaft A and the engaging-line of the gears is equal to the entire pitch-line diameter of the pinion D, with an effect equal to that of a pinion twice the diameter of the pinion D, and arranged concentric to the shaft A and engaging the rack. There is, therefore, a constantly-accelerated movement of the rack, beginning from zero and increasing in proportion to the extent to which the rack and part connected thereto is moved, while the rack and the pinion are always in engagement, so that the movement is a positive one without slip or lost motion. When the movement of the shaft A is reversed, the effect is to move the rack C first with a rapid and then with a gradually-diminishing rate of movement. A like effect is produced if the shaft is revolved in the opposite direction to shift the rack C to the right, and where it is desired to start from a central position at a rapid rate of movement and then gradually decrease the speed, the highest point of the converging rack-sections is at the center of the rack, as shown in Fig. 6.

In the construction shown in Figs. 2, 3, 4, and 6 the rack will move in a straight line and may, therefore, be secured positively to the valve or other object to be moved; but a straight rack may be used by pivoting such rack to the valve or other object, as shown in Fig. 5, so that the rack will swing as the pinion D is carried to a greater or less height by the revolution of the shaft A. A different means may be employed for holding the rack into engagement with the pinion. Where the rack moves in a straight line, there may be a guide 5, supported by an arm 6, extending to the valve-casing 7, and where there is a pivoted rack the guard may be in the form of a yoke 8, connected at its ends to the rack and extending beneath the pinion D, which in such case is preferably made with a flat periphery $y$ at one side of the toothed portion, which periphery is against the inner edge of the guide.

When the above-described movement is applied to moving the valve of an elevator, the parts are generally arranged so that when the apparatus is at rest the rack C will be in its central position, (shown in Figs. 2, 5, and 6,) and the movement of the hand-rope serves to turn the shaft, and however abruptly the said rope may be moved the valve will only start in its movement slowly and gradually move more rapidly after the main piston and cage have been started in their movements.

While I have exhibited the improved movement in connection with the valves of elevating apparatus, it will be evident it may be employed wherever it is desirable to insure a gradually accelerated or gradually decreasing movement.

It will of course be evident that in some cases where the movement to be imparted to the rack is only equal to that from the center, as in Fig. 2, to one end and back to said center the rack will only be of half the length shown in Fig. 2, with a single inclined edge where the rack moves in a straight line. It will also be evident that the rack may be part of a pivoted arm 12, connected to a rack-shaft 13, as shown in Fig. 7, the rotation of the shaft A serving to rock the arm 13 at a gradually-accelerating speed.

While I have referred to the fact that the pitch-line or periphery of the pinion D intersects the axis of the shaft A, it will of course be evident that the exact intersection is not absolutely necessary, as the said periphery or pitch-line may be slightly at one side of said axis, but not to any material extent.

Without limiting myself to the precise construction and arrangement of parts shown, I claim—

1. A mechanical movement consisting of a shaft, a pinion secured to and arranged at one side of the axis of said shaft with the periphery intersecting said axis, and a rack engaging said pinion, substantially as set forth.

2. The combination of a shaft, a regular pinion carried by said shaft at one side of the axis thereof, a rack engaging with said pinion, and a guide arranged to hold the pinion and rack in gear, substantially as set forth.

3. The combination, in a mechanical movement, of a shaft, a regular pinion carried at one side of the axis of said shaft, and a rack having two inclined toothed edges and gearing with said pinion, substantially as described.

In testimony whereof I have signed my name to this specification in the presence of two subscribing witnesses.

GEORGE H. REYNOLDS.

Witnesses:
CHARLES E. FOSTER,
A. E. T. HANSMANN.